United States Patent [19]
Sousek

[11] 3,817,464
[45] June 18, 1974

[54] SINGLE BLADE RECUTTER FOR FORAGE HARVESTER

[75] Inventor: Eugene A. Sousek, Appleton, Wis.
[73] Assignee: Koehring Company, Milwaukee, Wis.
[22] Filed: Nov. 27, 1972
[21] Appl. No.: 309,678

[52] U.S. Cl. .............................. 241/222, 241/291
[51] Int. Cl. ............................................ B02c 18/06
[58] Field of Search ......................... 241/220–222, 241/239, 241, 244–245, 259.1, 259.3, 291, 300.1, 188 R, 189 R, 73, 85–86, 88, 88.1, 88.2; 56/294, 504–505

[56] References Cited
UNITED STATES PATENTS

| 506,117 | 11/1893 | Josselin | 241/221 X |
| 1,027,537 | 5/1912 | Haldeman | 241/291 |
| 2,890,840 | 6/1959 | Fletcher et al. | 241/86 X |
| 3,141,485 | 7/1964 | Bonner et al. | 56/294 X |
| 3,194,288 | 7/1965 | Dodgen et al. | 241/88 X |
| 3,452,796 | 7/1969 | Hennen | 241/220 X |
| 3,566,943 | 3/1971 | Witt | 241/88 |

Primary Examiner—Granville Y. Custer, Jr.
Assistant Examiner—Howard N. Goldberg
Attorney, Agent, or Firm—Andrew J. Beck

[57] ABSTRACT

A forage cutter includes a housing having a pair of end walls, a forward inlet for receiving forage material and a rearward outlet for discharging forage material. A rotary cylinder shaft is journaled for rotation in the end walls, and a rotary cylindrical cutter having a plurality of cutting knives is mounted on the shaft for rotation about its longitudinal axis. The cutting knives are movable in a 360° cylindrical cutting path having a 0° reference on a horizontal plane extending radially from the axis of the cutter through the forward inlet. A recutter having a single recutter blade disposed at the outlet of the housing is positioned in coacting shearing relation with the cutting knives. The recutter blade is horizontally positioned between about 120° to 150° from the horizontal plane in the direction of the cylindrical cutting path.

14 Claims, 7 Drawing Figures

SINGLE BLADE RECUTTER FOR FORAGE HARVESTER

This invention relates to forage harvesters having a cutting unit that includes a recutter which coacts with the rotatable cylindrical cutter of the cutting unit, and more particularly to improvements in the recutter.

BACKGROUND OF THE INVENTION

One component of forage harvesters is a forage cutting unit which receives crop material, such as haylage, oat silage, mature corn silage, or ear corn silage, cuts it into small pieces and discharges the pieces rearwardly, usually into a trailing wagon. In the past, forage cutting units have had two major functions; (1) to cut crop material and (2) to propel the material rearwardly with sufficient velocity to carry the material to the trailing wagon.

The cutting units generally comprise a horizontally disposed housing having a front inlet and rearwardly directed discharge outlet. A stationary shear bar is mounted at the lower edge of the inlet. A cylindrical cutter having cutting knives mounted on a cutterhead is rotatable within the housing. The knives move downwardly past the shear bar and then rearwardly toward the discharge outlet.

In the past, the propulsion of the material through the discharge outlet has come partly from the centrifugal throwing action of the knives and partly from the air current generated by the fast moving knives and cutterhead. In recent years, the function of the cutter in propelling the cut material rearwardly has been largely replaced by use of an independent blower to propel the cut material. Forage harvesters employing an independent blower have the advantage that a stationary recutter screen that coacts with the rotating knives of the cylindrical cutter can be placed at the discharge side of the cutting unit to provide substantially uniform, complete and fine cutting of the crop material.

A recutter screen is a curved, semi-circular, plate that conforms to the cylindrical cutter and contains many holes or perforations over its entire surface. The recutter screen is made to fit under the rotary knives of the cylindrical cutter and is normally set in a position where the rotary knives almost touch the inside surface of the screen. The inside surface of a recutter screen preferably presents a large number of cutting surfaces that coact with the rotary knives. The recutter screen causes the forage to be held in the cylindrical cutter and to be re-cut by the rotary knives until the forage can escape to the discharge outlet through the holes of the screen.

To achieve substantially uniform length cutting of forage, the stems of the forage should be on a line parallel to the direction of travel through the cutting mechanism. Swathers, windrowers, or mowers and crimpers which prepare the forage for feeding to a forage harvester, however, usually do not align the forage parallel to the direction of travel and present a serious problem to the forage harvester in maintaining a uniform length of cut. Most forage harvesters will pick up a windrow in the same manner in which it is laid down and thus do not materially change the position of the stems in the windrow. The harvester picks the stems up and conveys them through the feed rolls and cutting mechanism without altering their position. The harvester may move the forage sidewise for a short distance, but it will not materially change the relation of the stems to the direction of travel. Thus, material which is laid parallel in the windrow, will remain parallel and stems which are crosswise will pass through the feed rolls and cutting mechanism crosswise. The function of the recutter screen is to deflect the long stems as they leave the cutterhead to enable the rotary knives to cut them one or several times more to bring them to a substantially uniform length.

A recutter screen actually serves several different purposes depending upon the type of material which is being recut. For example, in cutting haylage the recutter screen is used to reduce long stems, that pass through the cylindrical cutter perpendicular to the direction of travel, to a uniform short length, but not to shorten the actual length of the cut of the bulk of the material.

When grinding ear corn, the recutter screen is used to retain the particles of ear corn within the cutting cylinder until the larger particles are reduced to a fine enough consistency so that they will pass through the small diameter holes in the recutter screen. In cutting a sudan-sorghum mixture a recutter screen is used to break up any long stems which may have passed through the feeding mechanism at an angle to the direction of travel. Also, recutter screens are used in harvesting whole corn silage to prevent long pieces of leaves, stalks or "nubbins" of ears from passing through without being cut to a uniform length.

The use of a recutter screen has numerous advantages. For example, the use of a recutter screen increases the palatability of resulting feed because the reduction of all material to uniform length avoids the problem of cattle sorting out long stems, pieces of ears, and material which if not reduced to a uniform length, becomes objectionable to their taste. Tests indicate cattle fed recut material will leave no portion of the stalk or ear in the manger since all of the corn plant including stalk and ear, have been reduced to a uniform consistency whereas cattle will leave the long stems, pieces of stalk and parts of ear material cut without a recutter. The cutting of haylage to a uniform length by a recutter screen results in denser pack of the material and enables from 20 to 40 percent more material to be stored in a silo or structure. Further, the denser pack of silage eliminates more air and reduces spoilage. Recutting material in the field eliminates the need for special recutting equipment at the silo or structure. The more uniform cut achieved with a recutter screen also permits a denser pack in the wagon and results in fewer trips between the field and the storage area.

Until the present invention, the prior art has taught that multiple cutting-surface recutter screens were necessary to achieve the desired fine and uniform cutting of random oriented forage as picked up from a swath or windrow. Although the use of a recutter screen provides numerous advantages, forage harvesters having recutter screens require significantly more power to operate the cutting mechanism. Further, recutter screens have a tendency to overcut the forage material being fed to the cutting mechanism because the forage material is usually carried around the periphery of the cutter housing a number of times before it passes through the holes of the recutter screen even though it has reached a size where it can pass through the holes.

SUMMARY OF THE INVENTION

The present invention overcomes the problems of increased power requirements caused by the use of conventional recutter screens and the overcutting of forage material by multiple cutting surface recutter screens. Surprisingly, it has been found, in accordance with the present invention, that a recutter having a single horizontal recutter blade positioned at the discharge of the cylindrical cutter provides sufficient recutting of disoriented material to achieve substantially uniformly cut forage without overcutting and without undue power requirements.

Briefly, the present invention comprises a forage cutter including: a housing having a front wall terminating in a forward inlet for receiving forage material and a back wall having a rearward outlet for discharging forage material; a rotary cylindrical cutter mounted for rotation about its longitudinal axis in the housing and having a plurality of cutting knives movable in a cylindrical cutting path; a stationary shear bar adjacent the outlet and positioned in coacting shearing relation with the cutting knives; and a recutter having a single recutter blade disposed at the outlet of the housing and positioned in coacting shearing relation with the cutting knives.

Preferably, the cylindrical cutting path of the cutting knives has a 0° reference on a horizontal plane extending radially from the axis of the cutter toward the front wall of the housing, and the recutter blade is positioned about the cutting path at a point where forage material is released from the cylindrical cutter as it moves through the housing. It is further preferred that the recutter blade be positioned between about 120° to 150° from the horizontal plane in the direction of the cutting path. Additionally, it is preferred that the forage cutter include feeding means for horizontally directing forage material into the inlet of the housing. Desirably, the inlet has an upper end between about 15° to 60° above the horizontal plane and a lower end between about 15° to 30° below the horizontal plane. It is also preferred that the outlet has a lower end at least 60° from the horizontal plane in the direction of the cutting path and an upper end between about 150° to 240° from the horizontal plane in the direction of the cutting path.

It is further preferred that the recutter includes a frame for supporting the recutter blade and positioning it at the outlet, the frame being comprised of two spaced apart end members each having a top and bottom, an upper plate joining the end members at their tops, a lower plate joining the end members at their bottoms, and blade support means in the form of a blade support plate positioned between the upper and lower plates. Desirably, the recutter blade is positioned below the blade support plate and is secured to it. The recutter blade preferably is adjustably secured to the blade support plate and the recutter frame is adjustably secured to the housing. Desirably, the end members and lower plate are arcuately shaped.

It is to be understood that both the foregoing general description and the following detailed description are exemplary and explanatory but are not restrictive of the invention.

The accompanying drawings illustrate examples of preferred embodiments of the invention and together with this description serve to explain the principles of the invention.

Figure 1:
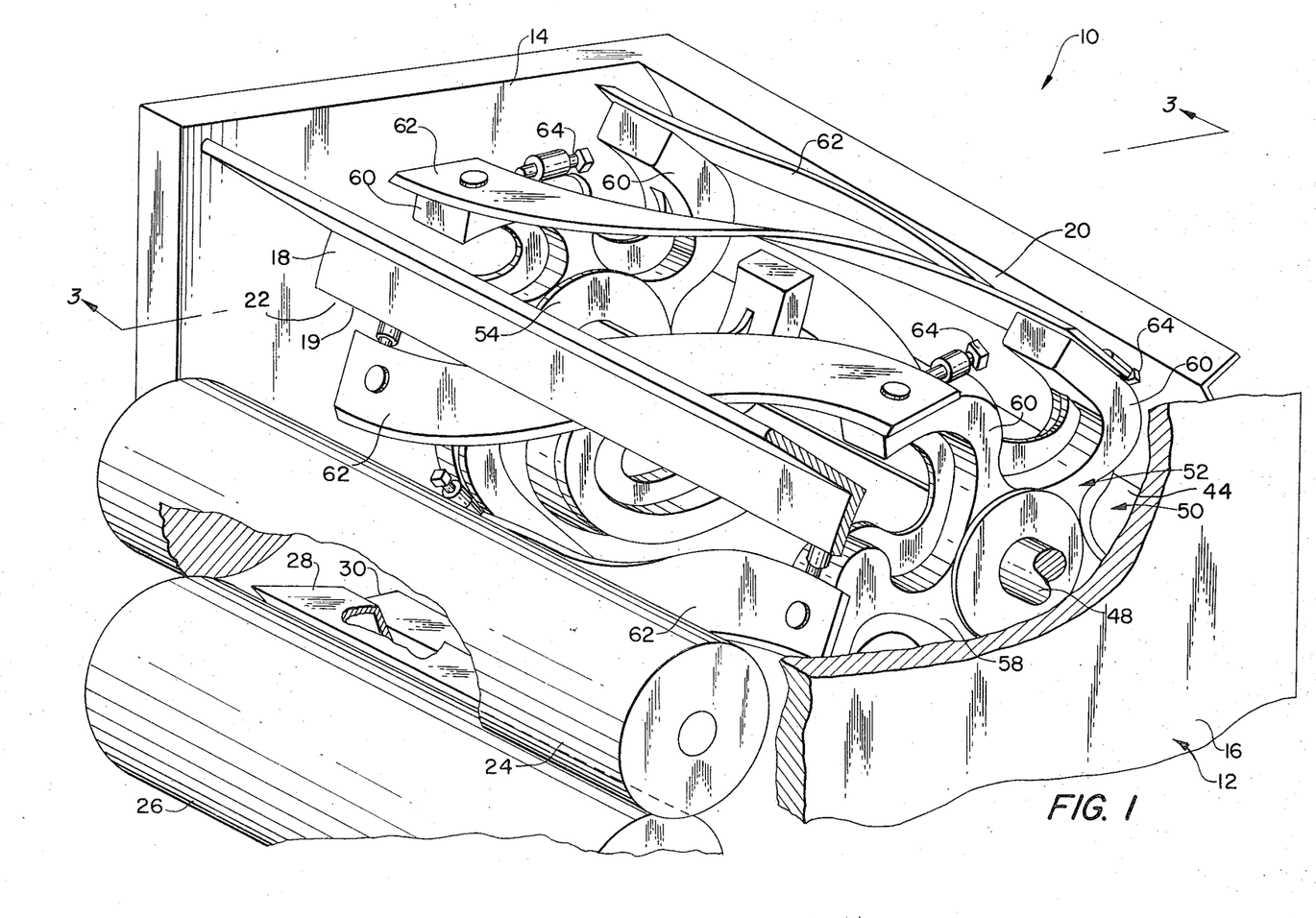
FIG. 1 is a fragmentary perspective view of the front of a forage cutter constructed in accordance with the teachings of the present invention.
Figure 3:
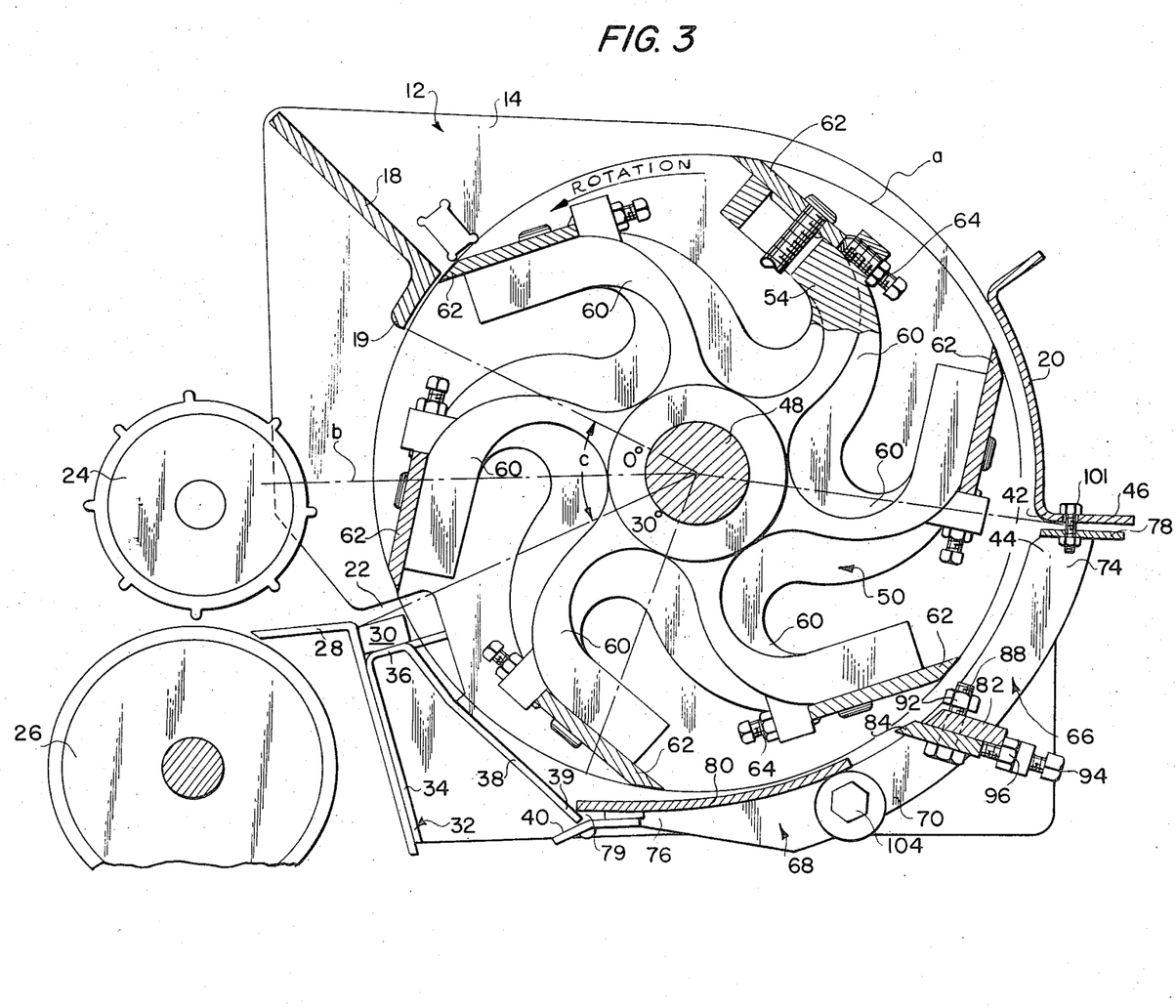
FIG. 3 is a fragmentary vertical sectional view taken along line 3—3 of FIG. 1 and shows a single blade recutter installed in operative position.

DETAILED DESCRIPTION OF THE INVENTION:

Referring to FIG. 1, the present invention is embodied in a forage harvester having a forage cutter, generally 10. Forage cutter 10 includes a housing, generally 12, having first and second opposing end walls 14 and 16, respectively, a front wall 18 and a back wall 20 known as a rear cross channel. Front wall 18 terminates at a lower end 19 which defines the upper end of a horizontal inlet 22. Forage feeding means including horizontal upper and lower feed rolls 24 and 26, respectively, are disposed forwardly of inlet 22. As seen in FIGS. 1 and 3, an infeed platform 28 defines the lower end of inlet 22 and extends rearwardly from lower feed roll 26. A stationary shear bar 30 that can be fixed or adjustable is disposed adjacent inlet 22 on the lower side thereof. As best seen in FIG. 3, shear bar 30 is mounted on a cutting bar rest, generally 32 which extends between end walls 14 and 16 of housing 12. Bar rest 32 comprises a front wall 34, a top wall 36 on which shear bar 30 is mounted, and a rear wall 38 which is inclined from its top toward the rear of housing 12.

Figure 2:
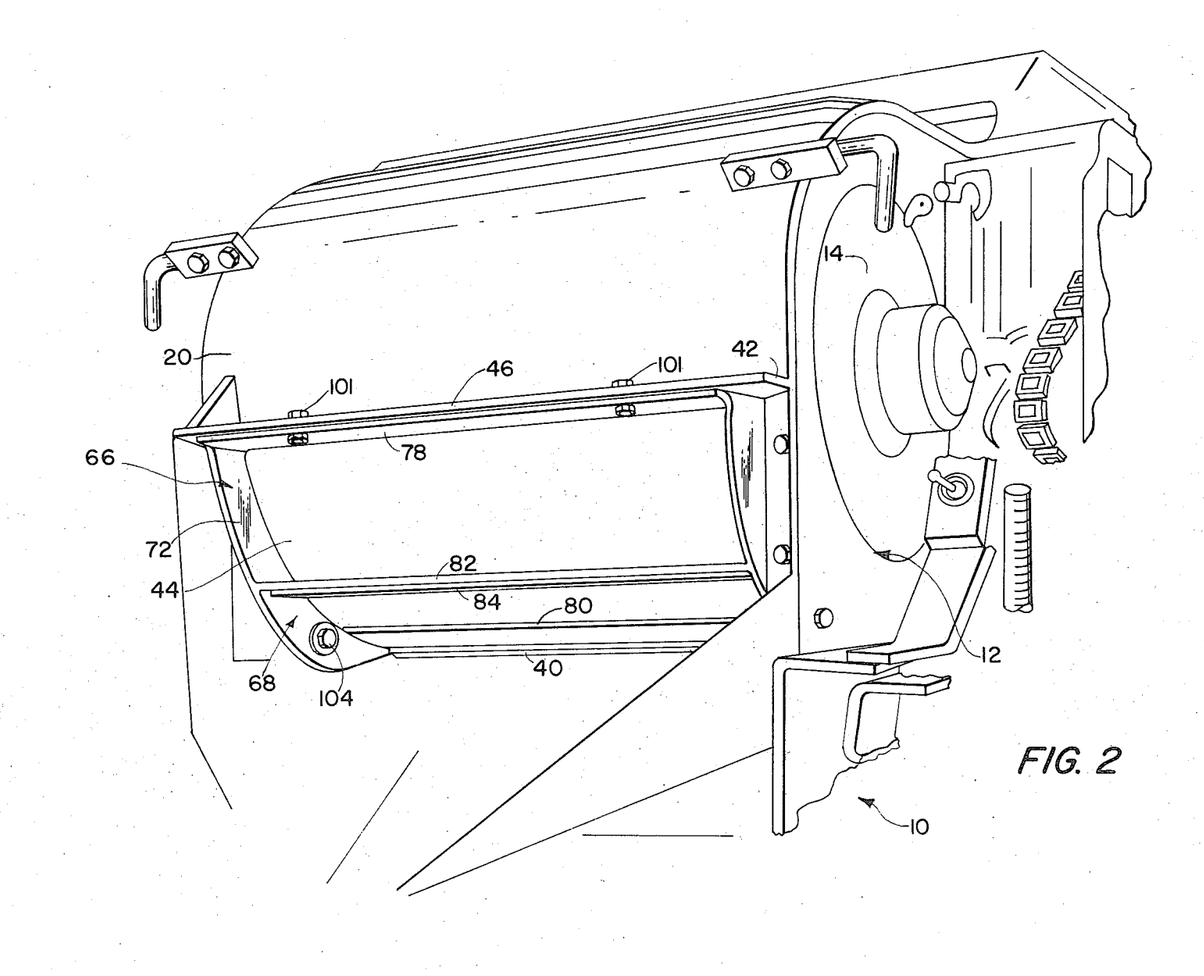
FIG. 2 is a fragmentary perspective view showing the rear of a forage cutter constructed in accordance with the teaching of the present invention and a single blade recutter mounted at the discharge outlet of the housing.

As best seen in FIGS. 2 and 3, back wall 20 extends along the upper portion of housing 12 and is at the discharge side of the forage cutter. Back wall 20 terminates at a lower end 42 which defines the upper end of an outlet opening 44 through which cut material may be discharged. Back wall 20 has a horizontal flange 46 at its lower end 42 which extends rearwardly from end wall 14 to end wall 16 of housing 12.

As best seen in FIGS. 1, 2 and 3 a rotary cylinder shaft, generally 48, is suitably journaled for rotation in end walls 14 and 16 and is suitably driven by conventional drive means (not shown) in a counterclockwise direction as viewed in FIG. 3. A rotary cylindrical cutter, generally 50, is mounted on cylinder shaft 48 within housing 12. As best seen in FIG. 1, cutter 50 includes a knifehead, generally 52, comprised of a first knife support 54 secured to cylinder shaft 48 adjacent end wall 14, and a second knive support 58 secured to the cylinder shaft adjacent end wall 16. Knife support 54 has a plurality of radially extending arms 60 which are aligned with an equal number of similar arms on knife support 58. A longitudinally extending cutting knife 62 is secured to each set of aligned arms and set screws 64 are mounted adjacent cutting knives 62 on each arm 60 of knife supports 54 and 58 to permit individual and precise adjustment of knives 62. Knives 62 rotate about the longitudinal axis of cutter 50 in a counterclockwise direction as viewed in FIGS. 1 and 3 and coact in cutting relationship with shear bar 30 mounted in inlet 22. Knives 62 are helicoidal in shape and overlap each other so that as one knife terminates its shearing coaction with shear bar 30, the next knife begins its shearing coaction with the shear bar to leave no cutting gap from one knife to the next and provide for continuous shearing action.

Knives 62 are movable in a 360° cylindrical cutting path "a" best seen in FIG. 3. Cutting path "a" has a 0° reference on a horizontal plane "b" extending radially from the axis of cutter 50 toward front wall 18 of housing 12. As best seen in FIG. 3, cutting knives 62 coact with shear bar 30 to cut horizontally entering forage material in a direction substantially perpendicular to the horizontal. To achieve this perpendicular cut of the horizontally entering forage material, the forage material should enter housing 12 between about 15° and about 60° above horizontal plane "b" and between about 15° and 30° below the horizontal plane. If forage material enters housing 12 more than about 60° above horizontal plane "b" or more than about 30° below the plane, cutting knives 62 will not be able to cut the forage material in a substantially perpendicular direction and will have a tendency to push the forage material through the housing instead of cutting it. To insure that the forage material enters housing 12 at a proper location, and as best seen in FIG. 3, the upper end of inlet 22 defined by lower end 19 of front wall 18 of housing 12 is between 15° to 60° above horizontal plane "b" and the lower end of the inlet defined by infeed platform 28 is about 15° to 30° below the horizontal plane. Preferably, inlet 22 spans an arc "c" of 60° and horizontal plane "b" passes midway through this arc so that the upper end of inlet 22 is 30° above the horizontal plane and the lower end of the inlet is 30° below the horizontal plane. Upper feed roll 24 is spring mounted in a conventional manner to permit it to move up and down to accommodate variations in the thickness of the entering forage material. The movement of feed roll 24 is limited so that its lower end does not rise above the upper end of inlet 22.

As best seen in FIG. 3, the lower end of outlet 44 is defined by the lower end 39 of rear wall 38 of cutting bar rest 32 and is at least 60° from horizontal plane "b" in the direction of cutting path "a." The upper end of outlet 44 defined by lower end 42 of back wall 20 is between about 150° to 240° from horizontal plane "b" in the direction of cutting path "a."

Figure 4:
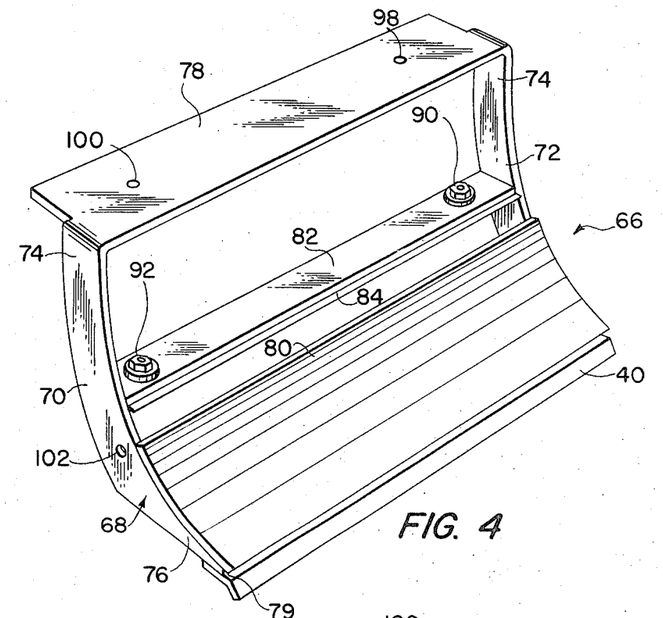
FIG. 4 is a perspective view of the front of a single blade recutter constructed in accordance with the teachings of this invention.
Figure 5:
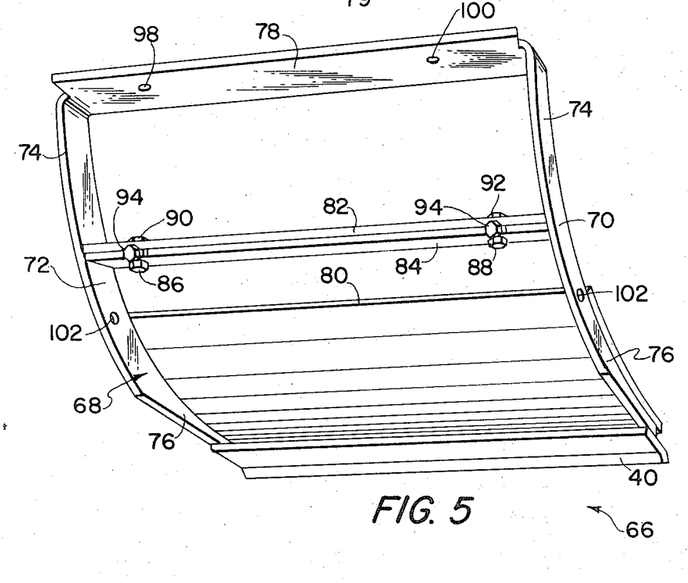
FIG. 5 is a perspective view of the rear of the single blade recutter of FIG. 4.

In accordance with the invention, a recutter having a single, horizontal recutter blade disposed at the outlet of the housing is positioned in coacting relation with the cutting knives. As here embodied, and as best shown in FIGS. 2, 3, 4 and 5, a recutter, generally 66, includes a recutter blade 84 and a frame, generally 68 for supporting recutter blade 84 and positioning it at outlet 44 of housing 12. As best seen in FIGS. 4 and 5, frame 68 comprises two horizontally spaced apart arcuate shaped end members 70 and 72 each having a top 74 and a bottom 76, an upper plate 78 joining end members 70 and 72 at their tops 74, and an arcuately shaped lower plate 80 joining the end members at their bottoms 76. Lower plate 80 is secured to the inner curved surfaces of arcuate end members 70 and 72. Lower plate 80 is curved and extends from beyond the bottoms of end members 70 and 72 rearwardly toward upper plate 78. A longitudinally extending support bracket 40 is welded to the bottom surface of the lower end of lower plate 80 and as best seen in FIGS. 3 and 4 forms an opening 79 therewith. Frame 68 also includes a horizontally extending blade support plate 82 positioned between upper plate 78 and lower plate 80 and the ends of the blade support plate are joined by conventional means as by welding to end members 70 and 72 of the frame.

Horizontally extending recutter blade 84 is positioned below blade support plate 82. Recutter blade 84 has one continuous cutting surface and this cutting surface is the only cutting surface in recutter 66. As best seen in FIG. 5, recutter blade 84 is secured to support plate 82 by two bolts 86 and 88 which extend vertically through recutter blade 84 and support plate 82. Recutter blade 84 and support plate 82 each have openings to receive bolts 86 and 88. Nuts 90 and 92 tighten down on bolts 86 and 88 respectively to securely fasten recutter blade 84 to blade support plate 82 of frame 68. The openings in recutter blade 84 are elongated to permit the recutter blade to be adjusted with respect to blade support plate 82. As best seen in FIGS. 3 and 5 an adjusting screw 94 abuts against the back of recutter blade 84 and passes through a nut 96 welded or otherwise conventionally affixed to the back of blade support plate 82 to enable the blade to be accurately and adjustably positioned with respect to support plate 82 before nuts 90 and 92 tighten recutter blade 84 to blade support plate 82.

Figure 6:
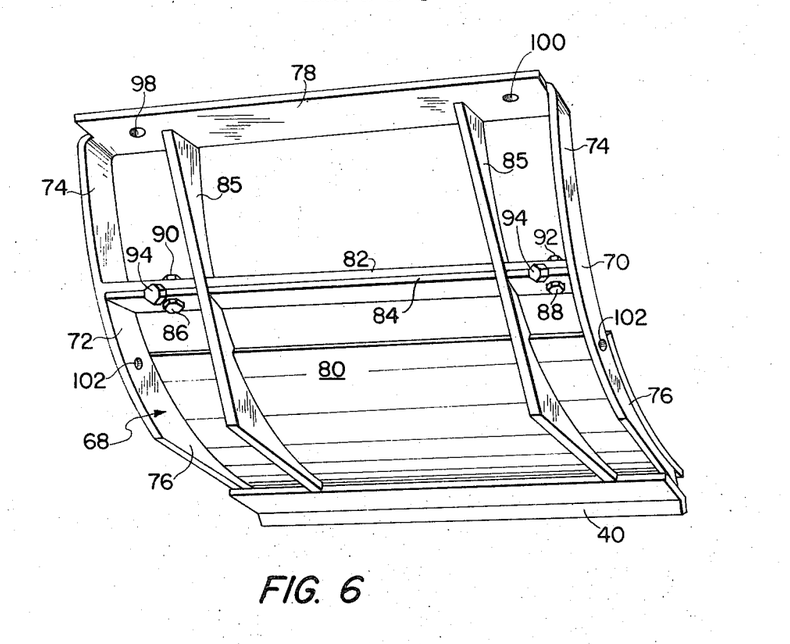
FIG. 6 is a perspective view of an alternate embodiment of the invention showing a plurality of struts extending from the top of the recutter frame to the bottom of the recutter frame.

In one embodiment of the invention, and as shown in FIG. 6, one or more curved vertically extending struts 85 can be fixed rearwardly of recutter blade 84 between upper plate 78 and lower plate 80 parallel to end members 70 and 72. These struts serve to provide additional rigidity to frame 68.

Figure 7:
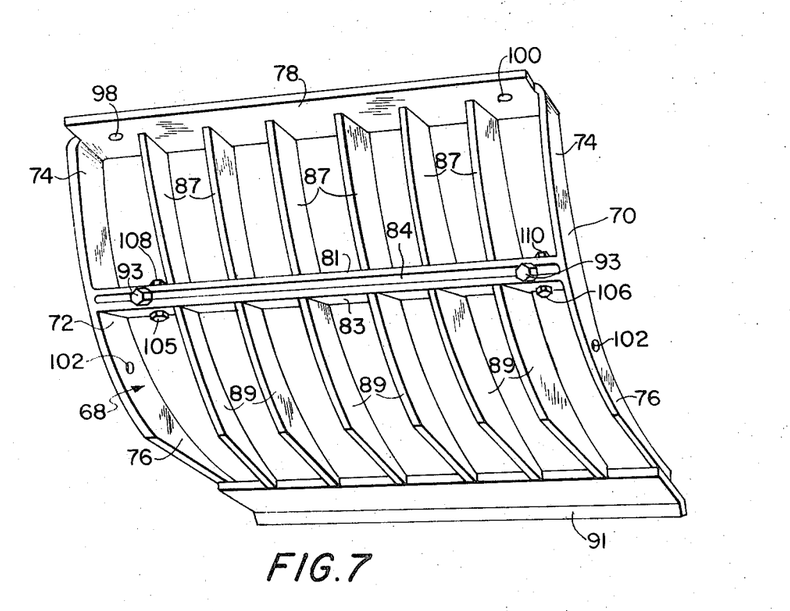
FIG. 7 is a perspective view of another alternate embodiment of the invention showing a first set of struts extending from above the recutter blade to the top of the recutter frame and a second set of struts extending from below the recutter blade to the bottom of the recutter frame.

In a further embodiment of the invention, and as seen in FIG. 7, recutter blade 84 is positioned and held between an upper horizontally extending blade support plate 81 and a lower horizontally extending blade support plate 83. The ends of support plates 81 and 83 are joined by conventional means such as by welding to end members 70 and 72 of frame 68. Recutter blade 84 is secured to support plates 81 and 83 by two bolts 105 and 106 which extend vertically through recutter blade 84 and support plates 81 and 83. Support plates 81 and 83 each have openings to receive bolts 105 and 106. Nuts 108 and 110 tighten down on bolts 105 and 106 respectively to securely fasten recutter blade 84 to blade supports plates 81 and 83. Recutter blade 84 can be adjusted with respect to blade support plates 81 and 83 by an adjusting screw 93 secured to the back of upper blade support plate 81 in a manner similar to that described above in connection with adjusting screw 94.

In the embodiment of FIG. 7, recutter frame 68 is provided with a plurality of pairs of struts. Each pair of struts comprises an upper strut 87 extending from the upper blade support plate 81 to upper plate 78 of recutter frame 68 and a lower strut 89 extending downwardly from lower blade support plate 83. As shown in FIG. 7, six pairs of struts are provided. Arcuately shaped lower plate 80 is not present in the embodiment of the invention and is replaced by a lower plate in the form of a longitudinally extending brace 91. Brace 91 is secured to the rear surfaces of end members 70 and 72 at their lower ends. The lower ends of lower struts 89 are secured to brace 91 by conventional means as by welding and the upper ends of struts 89 are similarly secured to lower blade support 83. The ends of upper struts 87 are similarly secured to upper plate 78 and upper blade support plate 81 by conventional means.

As best seen in FIGS. 2 and 3 frame 68 is mounted in outlet 44 of housing 12. Recutter 66 is adjustably and removably secured to housing 12 and can be so secured in any conventional manner. As here illustrated upper plate 78 of frame 68, as shown in FIGS. 4 and 5, has two openings 98 and 100 which can be aligned with openings in flange 46 of back wall 20 of housing 12. As shown in FIGS. 2 and 3, upper plate 78 is secured to flange 46 by bolts 101. The openings in upper plate 78 are larger than the openings in flange 46 to permit frame 68 to be adjusted relative to rotary knives 62 of cylindrical cutter 50. As shown in FIGS. 4 and 5, end members 70 and 72 of frame 68 each have an opening 102. Openings 102 can be aligned with a corresponding opening in end walls 14 and 16 of housing 12. Openings 102 in end members 70 and 72 are larger than the openings in end walls 14 and 16 and as shown in FIGS. 2 and 3 an eccentric bolt 104 passes through each pair of aligned openings to permit further adjustment of frame 68 relative to the rotary knives 62 of cylindrical cutter 50. When frame 68 is suitably adjusted in housing 12, and as best seen in FIG. 3 lower end 39 of rear wall 38 of rest bar 32 is positioned in opening 79 to contact support bracket 40 and be overlapped by the bottom forward edge of lower plate 80.

As best seen in FIG. 3, recutter blade 84 is positioned in housing 12 so that it intersects cutting path "a" at a point where forage material is released from the cylindrical cutter as it moves through housing 12. It has been found that due to centrifugal force, cutting knives 62 carry forage material around housing 12 for a short distance after the cutting knives coact with shear bar 30 and do not release any major portion of the forage material for discharge through outlet 44 until the cutting knives reach a position of between about 120° to 150° from horizontal plane "b" in the direction of cylindrical cutting path "a." The present invention positions recutter blade at this 120° to 150° location from horizontal plane "b" to take advantage of the release of the major portion of forage material at this location and insure that the major portion of the forage material is subjected to the recutting coaction of cutting knives 62 and recutter blade 84. Preferably, recutter blade 84 intersects cutting path "a" at the 120° position. The location of recutter blade 84 at the 120° to 150° position provides sufficient recutting of disoriented forage to produce cut forage of uniform length.

With the recutter 66 installed, the effective upper end of outlet 44 is defined by the lower surface of plate 78, and the effective lower end of outlet 44 is defined by the upper edge of plate 80. Preferably, the upper edge of plate 80 is about 90° to 110° from horizontal plane "b" in the direction of cutting path "a," and the lower surface of plate 78 is about 170° to 210° from horizontal plane "b" in the direction of cutting path "a."

In operation, and with particular reference to FIG. 3, after the forage has passed shear bar 30, it moves within housing 12 by the rotation of cutter 50 and is directed toward recutter blade 84 by lower plate 80 of frame 68. As the forage moves through housing 12, disoriented long stem forage is cut by the shearing coaction of recutter blade 84 with rotary knives 62. It is believed multiple rotary knives 62 of cylindrical cutter 50 contribute to the provision of sufficient recutting by recutter blade 84, because the helicoidal shape of the knives causes the disoriented long stems to vertically deflect as the stems are moved through housing 12 by the rotary knives. This deflection causes the stems to extend vertically across horizontal recutter blade 84 to block their exit to outlet 44 and insures that the stems will be cut by recutter blade 84.

In addition to providing recutting, the recutter of the present invention has the further advantage that the single recutter blade 84 interferes with the movement of the forage out of housing 12 through outlet 44 less than a conventional recutter screen. A recutter screen has a considerably larger surface area to prevent the forage from reaching outlet 44 of the cutter housing than recutter 66 of the present invention. Recutter 66 is a substantially open structure and generally the only portion of it that can block forage material from leaving housing 12 through outlet 44 between lower plate 80 and upper plate 78 is defined by recutter blade 84 and blade support 82. Less interference with the movement of forage out of housing 12 causes less forage to be carried around the full housing periphery for a second cutting and recutting cycle and results in a substantial reduction in the amount of forage that is overcut.

Further, when forage is carried around housing 12 for a second cutting and recutting cycle, this forage interferes with incoming forage material and results in the use of increased horsepower to operate cylindrical cutter 50. Thus, the present invention, by causing less forage to go through a second cutting and recutting cycle than a recutter screen results in less horsepower being used to operate cylindrical cutter 50 than when a conventional prior art recutter screen is used. The single blade recutter of the present invention thus achieves all of the advantages obtained through the use of a recutter screen, and substantially eliminates the overcutting of forage and the increased horsepower needed to compensate for the overcutting that are associated with the use of a recutter screen.

The invention in its broader aspects is not limited to the specific details shown and described and departures may be made from such details without departing from the principles of the invention and without sacrificing its chief advantages.

What is claimed is:

1. A forage cutter for cutting forage material comprising:
   a. a housing including a front wall terminating in a forward inlet for receiving forage material and a back wall having an outlet for discharging forage material;
   b. a rotary cylindrical cutter mounted for rotation about its longitudinal axis in the housing and having a plurality of cutting knives movable in a cylindrical cutting path;

c. a stationary shear bar adjacent said inlet and positioned in coacting shearing relation with the cutting knives; and d. a recutter having a single recutter blade, said blade being disposed at the outlet of the housing and positioned in coacting shearing relation with the cutting knives, said recutter including a frame for supporting the recutter blade and positioning it at the outlet, said frame comprised of two spaced apart end members each having a top and bottom, an upper plate joining the end members at their tops, a lower plate joining the end members at their bottoms, and blade support means positioned between the upper and lower plates for supporting said recutter blade.

2. The forage cutter of claim 1 wherein said blade support means is a support plate and wherein the recutter blade is secured to the blade support plate.

3. The forage cutter of claim 2 wherein the recutter blade is positioned below the blade support plate and is adjustably secured to it, and the frame is adjustably secured to the housing.

4. The forage cutter of claim 1 wherein the end members and the lower plate are arcuately shaped.

5. A forage cutter for cutting forage material comprising:

a. a housing having a front wall terminating in a forward inlet for receiving forage material and a back wall having a rearward outlet for discharging forage material;

b. a rotary cylindrical cutter mounted for rotation about its longitudinal axis in the housing and having a plurality of cutting knives movable in a cylindrical cutting path having a 0° reference on a horizontal plane extending radially from the axis of the cutter toward the front wall of the cutter housing;

c. a stationary shear bar adjacent the inlet and positioned in coacting relation with the cutting knives; and d. a recutter having a single recutter blade disposed at the outlet of the housing and positioned between about 120° to 150° from the horizontal plane in the direction of the cutting path in coacting shearing relation with the cutting knives, said recutter including a frame removably mounted on said housing for supporting said recutter blade and comprised of two spaced apart end members each having a top and bottom, an upper plate joining the end members at their tops, a lower plate joining the end members at their bottoms, and a blade support plate positioned between the upper and lower plates, said recutter blade being secured to the blade support plate.

6. The forage cutter of claim 1 wherein the recutter blade is positioned at a point where forage material is released from the cylindrical cutter as it moves through the housing.

7. The forage cutter of claim 1 wherein the cylindrical cutting path of the cutting knives has a 0° reference on a horizontal plane extending radially from the axis of the cutter toward the front wall of the cutter housing and the recutter blade is positioned between about 120° to 150° from the horizontal plane in the direction of the cutting path.

8. The forage cutter of claim 7 including feeding means for horizontally directing forage material into the inlet of the housing.

9. The forage cutter of claim 7 wherein the inlet has an upper end above the horizontal plane and a lower end below the horizontal plane.

10. The forage cutter of claim 8 wherein the upper end of the inlet is between 15° to 60° above the horizontal plane and the lower end of the inlet is between about 15° to 30° below the horizontal plane.

11. The forage cutter of claim 7 wherein the outlet has a lower end at least 60° from the horizontal plane in the direction of the cutting path and an upper end between about 150° to 240° from the horizontal plane in the direction of the cutting path.

12. A forage cutter for cutting forage material comprising:

a. a housing including a front wall terminating in a forward inlet for receiving forage material and a back wall having an outlet for discharging forage material;

b. a rotary cylindrical cutter mounted for rotation about its longitudinal axis in the housing and having a plurality of cutting knives movable in a cylindrical cutting path;

c. a stationary shear bar adjacent said inlet and positioned in coacting shearing relation with the cutting knives; and d. a recutter having a frame comprised of two spaced apart end members each having a lower end and an upper end, a plurality of vertically extending struts between and substantially parallel to said end members, a lower member joining said end members and struts, securing means at the top of the frame for attaching said frame to the housing, and a single substantially horizontal recutter blade mounted between said securing means and lower member, said blade being disposed at the outlet of the housing and positioned in coacting shearing relation with the cutting knives.

13. For use with a forage cutter having a housing which includes a front wall terminating in a forward inlet for receiving forage and a back wall having an outlet for discharging forage material, a rotary cylindrical cutter mounted for rotation about its longitudinal axis in the housing and having a plurality of cutting knives movable in a cylindrical cutting path and a stationary shear bar adjacent said inlet and positioned in coacting shearing relation with the cutting knives: the improvement comprising a recutter including a single recutter blade for disposition at the outlet of the housing and positioning in coacting shearing relation with the cutting knives of the forage cutter, a frame for supporting the recutter blade and positioning it at the outlet, said frame comprised of two spaced apart end members each having a top and bottom, securing means joining the end members at their top, a lower member joining the end members at their bottoms, and blade support means positioned between said securing means and said lower member for supporting said recutter blade.

14. For use with a forage cutter having a housing which includes a front wall terminating in a forward inlet for receiving forage and a back wall having an outlet for discharging forage material, a rotary cylindrical cutter mounted for rotation about its longitudinal axis in the housing and having a plurality of cutting knives movable in a cylindrical cutting path and a stationary shear bar adjacent said inlet and positioned in coacting shearing relation with the cutting knives: the improvement comprising a recutter having a frame comprised of two spaced apart end members each having a lower end and an upper end, a plurality of vertically extending struts between and substantially parallel to said end members, a lower member joining said end members and struts, securing means at the top of the frame for attaching said frame to the housing, and a single substantially horizontal recutter blade mounted between said securing means and lower member for disposition at the outlet of the housing and positioning in coacting shearing relation with the cutting knives.

* * * * *